(12) United States Patent
Kruberg et al.

(10) Patent No.: US 9,026,962 B2
(45) Date of Patent: May 5, 2015

(54) INTEGRATED ELECTRONIC DESIGN AUTOMATION SYSTEM

(71) Applicant: Gumstix, Inc., Portola Valley, CA (US)

(72) Inventors: Walter Gordon Kruberg, Portola Valley, CA (US); Neil C. MacMunn, Vancouver (CA)

(73) Assignee: Gumstix, Inc., Portola Valley, CA (US)

( * ) Notice: Subject to any disclaimer, the term of this patent is extended or adjusted under 35 U.S.C. 154(b) by 0 days.

(21) Appl. No.: 13/896,150

(22) Filed: May 16, 2013

(65) Prior Publication Data

US 2013/0326457 A1 Dec. 5, 2013

Related U.S. Application Data

(60) Provisional application No. 61/653,278, filed on May 30, 2012.

(51) Int. Cl.
*G06F 17/50* (2006.01)

(52) U.S. Cl.
CPC .................................. *G06F 17/5072* (2013.01)

(58) Field of Classification Search
CPC .............. G06F 17/509; G06F 2217/16; G06F 17/5036; G06F 17/5068; G06F 17/5045; G06F 2217/04; H01H 2029/008; H01L 27/11803

USPC .................. 716/101, 102, 104, 106, 111, 114
See application file for complete search history.

(56) References Cited

U.S. PATENT DOCUMENTS

| | | | |
|---|---|---|---|
| 7,441,219 B2 * | 10/2008 | Perry et al. ...................... | 716/118 |
| 2002/0108096 A1 * | 8/2002 | Lee et al. ......................... | 716/11 |
| 2009/0199149 A1 * | 8/2009 | Kwong ............................ | 716/15 |
| 2012/0079444 A1 * | 3/2012 | Zhang ............................ | 716/122 |

* cited by examiner

*Primary Examiner* — Brian Ngo
(74) *Attorney, Agent, or Firm* — Kilpatrick Townsend & Stockton LLP; Kenneth R. Allen

(57) ABSTRACT

An electronic design automation system combines features of discrete EDA/CAD systems and manufacturing systems into a monolithic system to enable a layperson to efficiently design, construct and have manufactured a specific class of custom electronic device, namely a computer processing unit with embedded software. A Graphical User Interface (GUI) is provided as the front-end to a Computer Aided Design (CAD) server that generates sophisticated control and manufacturing instructions that are delivered to a fabrication supply chain, which produces a specified device that is then transported via managed logistics into inventory and ordering systems at vendors for delivery to a designated customer.

5 Claims, 9 Drawing Sheets

System Block Diagram

FIG. 1 - System Block Diagram

The User dragged the COM module from the Module Image Library to the Board.
The Board outline turned red, indicating missing EIS Requirements.

INTEGRATED ELECTRONIC DESIGN AUTOMATION SYSTEM

CROSS-REFERENCES TO RELATED APPLICATIONS

The present application claims benefit under 35 USC 119 (e) of U.S. provisional Application No. 61/653,278, filed on May 30, 2012, entitled "Integrated Electronic Design Automation System," the content of which is incorporated herein by reference in its entirety.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates to electronic design automation and computer aided circuit design. More specifically this invention relates to the simplification of electronic circuit design such that a person without specific knowledge of circuit design could design and order a custom product and expect end-to-end integration of circuit design through manufacturing and delivery.

Electronic circuit boards provide the foundation of the electronics device industry: they essentially comprise "Printed Circuit Boards" or PCB (laminated layers of conductive material and an insulating substrate, where the conductive material forms traces or electrical signal pathways that connect components mounted on the outer surfaces) and electronic components such as resistors, integrated circuits, LED's, etc., which together form a functional circuit when provided with power connections and input and output couplings. Today, creating and building a custom circuit board requires the understanding of an electrical engineer with design expertise to select the components and arrange them conceptually before ordering the custom PCB and then orchestrating the supply of those components and contract manufacturers that assemble them. Although individual stages of this process may have been automated so engineers may be more effective and precise, to accomplish the entire process requires individuals skilled in several arts as well as an semi-automated supply chain for management of the part supply.

For example, an industrial designer may have an idea for a medical device that requires a microphone, a headset, push-buttons, and artificial intelligence software for medical decision-making, inside a particularly shaped enclosure. With known state-of-current-art techniques, such a product design would require an electrical design engineer to develop an electrical schematic before passing the design to a board layout expert, and then submitting the design to a logistics or manufacturing group for entering data and ordering components.

Computers-On-Modules (COMs) have been developed that alleviate the burden of complex circuit design from original equipment manufacturers across numerous domains. A COM requires only externally applied power to become a functioning computer: wireless communication and software are encompassed within. Expansion boards provide a mechanism to provide power to the COM and can provide potential functionality to certain types of COMs. By designing an expansion board, an electrical engineer can add a selection of input and output connectors to suit custom design needs. Gumstix, Inc., the assignee of the present invention, manufactures and offers a selection of demonstrative expansion boards for sale, as well as documentation for designers to develop their own uses.

The concept of integrated end-to-end-design-to-delivery systems is not new. For example, within limits, consumers may customize motor vehicles by selecting options as a part of online ordering for manufacturing, and publications can be designed and delivered though on-line service offerings. An example of an integrated and versatile publication process is described in U.S. Pat. No. 6,717,686 to Farros et al. assigned to iPrint.com.

However, no fully integrated systems are known to exist to provide dedicated end-to-end-design-to-delivery. What is needed is a tool for use by an essentially untrained user allowing the quick design of electronic products that may include one or more computers-on-module, and that will order and thus ultimately manufacture and deliver the products to an intended customer.

SUMMARY

According to the invention, a system and method are provided that enable a layperson, namely an intended user/designer without detailed design knowledge, for designing, building and delivering custom application printed circuit boards that may use computers-on-module as board components among other board components, in which the user/designer employs an automatic schematic or layout design interface of a schematic design tool to generate a board design, the schematic design tool in turn providing information to further subsystems with all needed constraints so that the subsystems can perform a board layout without further intervention from the user/designer, and further can generate gerbers and manufacturing instructions directly to vendors, fabricators and board assemblers with minimal human intervention, thereupon enabling delivery of finished custom application boards to an intended customer.

By layperson it is meant a designer as an intended user who has minimal experience in or knowledge of design and function of electronic circuits, or someone without formal electrical engineering design training. More specifically, an electronic design automation system is provided that combines features of discrete EDA/CAD systems and manufacturing systems into an integrated system to enable efficient design, construction and delivery of a specific class of custom electronic devices, namely a computer processing unit with embedded software. A Graphical User Interface (GUI) may be provided as the front-end [using for example JavaScript on a web browser] to a Computer Aided Design (CAD) server that generates sophisticated control and manufacturing instructions that are delivered to a fabrication module, which produces a specified device that is then transported via managed logistics into inventory and ordering systems at vendors for delivery to a designated customer. In addition, downloadable simulations of the resulting devices may be provided, as well as 3-D images, mechanicals and Linux OS kernels customized to the specific devices.

The subject of this invention is a system that provides laypersons as herein defined, such as industrial designers untrained and generally unskilled in the art of electrical engineering, a tool to design systems by a drag and drop method that places functional collections of physical components onto a field, automates and validates the electrical connections, and if the connections are valid, to download software for the board, images of the board, or electronic and physical simulations of the board. The system according to the invention may employ localized computational power on a local a processor or processors and local volatile and nonvolatile program storage memory all functioning as a single platform operative to perform all input/output, circuit board specification, design, layout, administrative and manufacturing functions, or the system according to the invention may be distributed Alternatively, the system according to the invention may be distributed across a network, including local area networks and the Internet, employing functionalities at both local and remote sites, where the all input/output, circuit board specification, design, layout, administrative and manufacturing functions are distributed among various processors and memory components in communication via appropriate communication protocols well known in the art. Details of specific implementations of the invention are left to those of skill in the art.

Using the user interface features of the inventive system, herein called "Geppetto's Workshop," or simply Geppetto, an intended lay user, typically an industrial designer without electrical engineering design training and expertise, can select placement of these components (including, if desired, one or more COMs) on a board and order the boards directly for delivery within a stated deadline.

Geppetto's Workshop is intended to provide a non-engineer the tool to design a custom computer of arbitrary dimension, including lights, switches, sensors and connectors. Nevertheless, Geppetto's Workshop does not require a COM to provide novelty design functions: its technique of connecting functional elements in a way that obviates the need for an electrical engineer is useful on boards of even modest complexity.

Important in ensuring delivery of a satisfactory electronic device is a method of examining the physical as well as the functional characteristics of the device. To this end, Geppetto's Workshop is configured to provide 3D visualization of the completed design in a browser window, and also to allow export of data for a user to import into external visualization tools. Geppetto's Workshop may also provide for download, data sufficient for characterization of device functionality to drive an external functional simulation of the device, e.g., in Qemu, an open-source device emulation system. This functional simulation could also be applied, within Geppetto's Workshop, to the 3D model to visualize device performance.

Important to the evaluation of a board after construction is the functional test to evaluate whether modules incorporate function as designed. Geppetto's Workshop is configured to export data sufficient to feed automated testing and functional validation of manufactured devices.

Devices intended to operate under software control generally require dedicated software development efforts. Geppetto's Workshop may provide for download of the software required to operate the device designed. The software may include the operating system software required, e.g. an Ubuntu or Angstrom Linux kernel and a root file system, to allow a user competent in Linux to direct the functions of the device.

The various aspects of the Geppetto's Workshop subsystem can run on one computer or be separated into processes spread over multiple systems. This includes systems coupled via local area networks, the Internet or using remote storage for local processors.

The invention will be better understood by reference to the following detailed description in conjunction with the accompanying drawing.

DETAILED DESCRIPTION OF THE INVENTION

Figure 1:
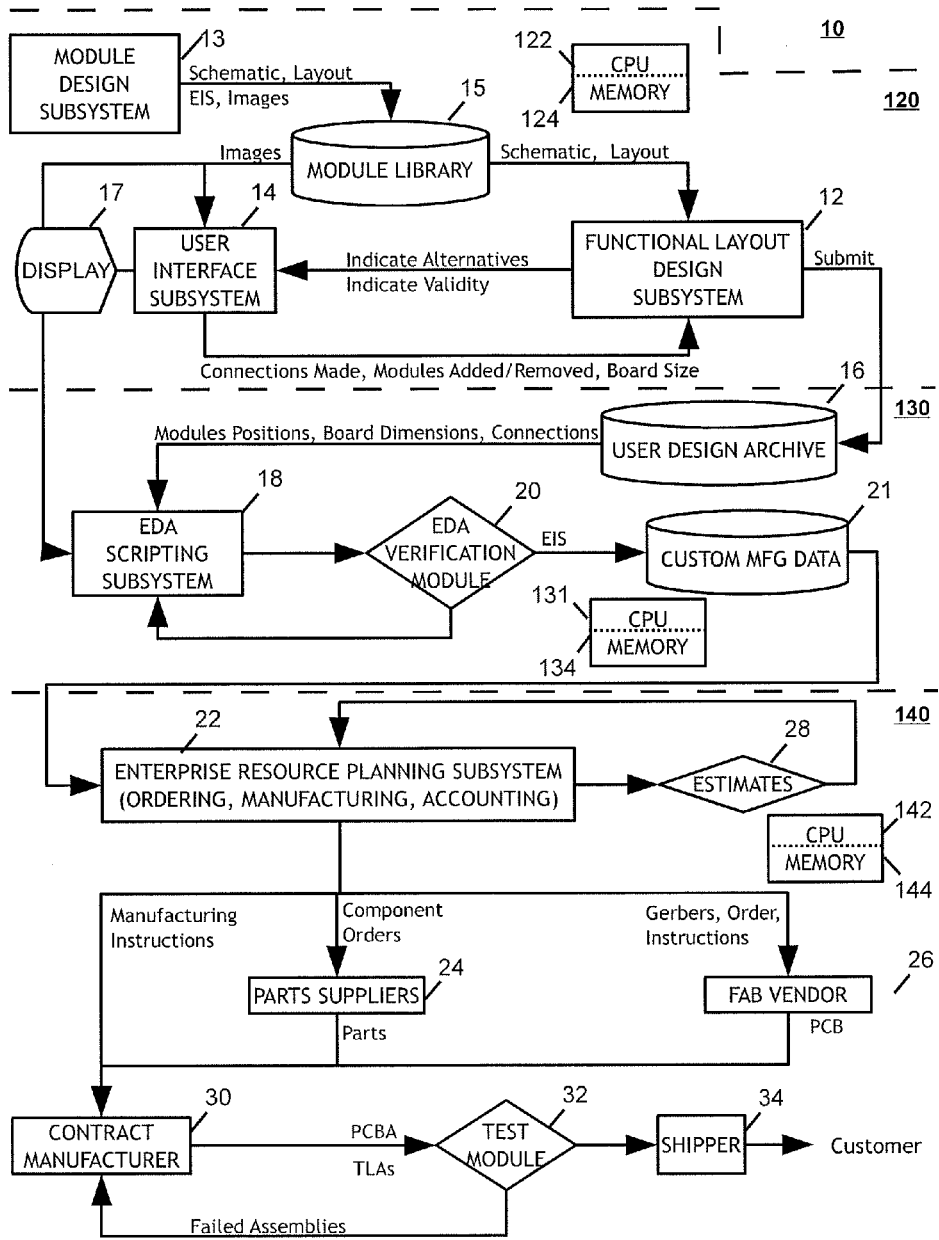
FIG. 1 is a schematic block diagram of an integrated design and manufacturing system according to the invention.

FIG. 1 illustrates features of an integrated circuit board design, layout and manufacturing system 10 according to the invention. The principal elements of interest are a functional design layout subsystem 120, a computer aided design subsystem 130 and an administrative subsystem 140, each with associated processors 122, 132, 142 and nonvolatile storage (program) memory 124, 134, 144 in which the programmed components of the subsystems reside. The operative element of the functional layout design subsystem is a functional layout design subsystem module, is also known as a schematic design subsystem, and associated with it is a user interface subsystem 14 and its interactive graphical display 17. The functional design layout subsystem 120 is part of "Geppetto's Workshop." In addition in the computer aided design subsystem 130, there is an electronic design automation scripting subsystem or EDA tool 18 and which has its own or a shared central processing unit 132 and nonvolatile storage memory 134. The administrative subsystem 140, which has one or more of its own or a shared central processing unit 142 and nonvolatile storage memory 144 (in which the programmed components reside), comprises an enterprise resource planning subsystem 22, plus a series of often disparate manufacturing and delivery subsystems, including parts vendors 24, a fab vendor 26, a contract manufacturer 30 and a shipper 34, all of which may be built around and which has a central processing unit and nonvolatile storage memory.

An intended lay user is able to interact with the functional layout subsystem module 12 through the user input interface (UII) subsystem 14, such as a client-side web page maintained by the system 10 and accessible via a secure URL. The functional layout design subsystem module 12 operates as hereinafter explained in connection with FIG. 2 to invoke and indicate selected program modules added and removed, board size and connections made in communication with the user input interface subsystem 14. It may also prompt the user through the display 17 of the UII subsystem 14 as to validity of choices and possible alternatives. Pre-approved module design data about pre-designed and verified functional elements (modules), including schematics, layouts, EIS, and images previously prepared by an electrical design engineer employing an offline, typically remote, module design subsystem 13 are drawn from a module library 15 accessible by the functional layout design subsystem module 12. The schematic and layout data are directed to the functional design layout subsystem 12 while the corresponding images are directed to the UII subsystem 14 and an EDA tool 18. The intended user lays out the schematic design interactively using drag and drop operations. The resultant completed functional layout design is stored as CAD drawings, netlists, modules positions, board dimensions, connections designs and other data related to the requested product in a user design archive 16 containing later-accessible user data. All of the elements of the system can be provided through either a dedicated system or a distributed system as for example in a networked or web-based environment. Therefore the invention is understood to be not limited to any particular system configuration.

To produce a product, the intended user through the user input interface 14 instructs that the design be retrieved from the user design archive 16 and directed to a physical layout design subsystem, herein the EDA scripting subsystem 18, based on a commercially available electronic design automation (EDA) tool 18. The EDA tool 18, such as a CAD server, is responsive to instructions to execute specific operations according to customized scripts as hereinafter explained to produce a physical layout design and other output associated with the product from the output of the user design archive 16 generated by the functional layout design subsystem module 12. The EDA tool 18 is for example an Eagle design system from CadSoft Computer GmbH and CadSoft Inc., subsidiaries of Premier Parnell plc of England, OrCAD from Cadence Design Systems of San Jose, Calif. or offerings from Mentor Graphics of Wilsonville, Oreg., The EDA tool 18, operating on instructions directing the customized scripts, generates a physical layout dataset consisting of a gerber-file-format layout image, an X-Y data component list with locations on a board, a bill of materials, manufacturing instructions, instructional images, including 3D images and such other images, an electrical interface specification (EIS) and datasets needed for physical layout, manufacturing, costing, shipping and the like.

The physical layout dataset is optionally directed through a design verification module 20 to verify the design. If the prior subsystems have been properly configured to pretest the schematic and layout, then no extra verification is required. A commercially available EDA tool 18 typically incorporates a design verification module so that an additional design verification module 20 is not a necessary element.

The verified design is stored at least briefly for retrieval in a custom manufacturing data store 21. Each design is unique, so that such store must be renewed with each order. The verified design is directed automatically to the administrative subsystem 140, more specifically the output of the computer aided design subsystem 130 and the functional layout design subsystem 120, as stored at least temporarily as custom manufacturing data in the custom manufacturing data store 21 is directed to an electronic resource planning (ERP) subsystem 22, which contains further automated subsystems for generating design gerbers, for ordering, for issuing instructions for manufacturing and for accounting. (SAP Inc. and Oracle of California provide suitable ERP subsystems, and others are known.)

The ERP subsystem 22 is according to the invention configured to automatically order parts from parts vendors 24, get estimates from, and select and direct orders to, a chosen fab vendor 26 with the assistance of an estimate request subsystem 28 that solicits and collects information about optimal vendors, judged for example by favorable pricing, reliability, availability of parts and speed of delivery. The fab vendor 26 produces fabs, also described as printed circuit boards (PCB), and, along with the parts vendors 24, is instructed to deliver to a to a contract manufacturer (CM) 30 for assembly. The CM 30 assembles the parts and fabs to produce printed circuit board assemblies (PCBA) and top-level assemblies (TLA) representing the final circuit board. The assemblies and TLAs are typically final tested in a test module 32 by the CM 30 and, once approved, passed to a shipper 34. The shipper 24 delivers the assemblies to the customer or the designer as designated at the user interface 14. Thus, if the parts vendors 24, fab vendor 26 and contract manufacturer 30 have appropriately configured internal subsystems to respond to automated ordering, gerber execution and manufacturing and shipping, the process from selection of the functionality by the intended user of a particular design of a circuit board to delivery to a customer is automated.

Figure 2:
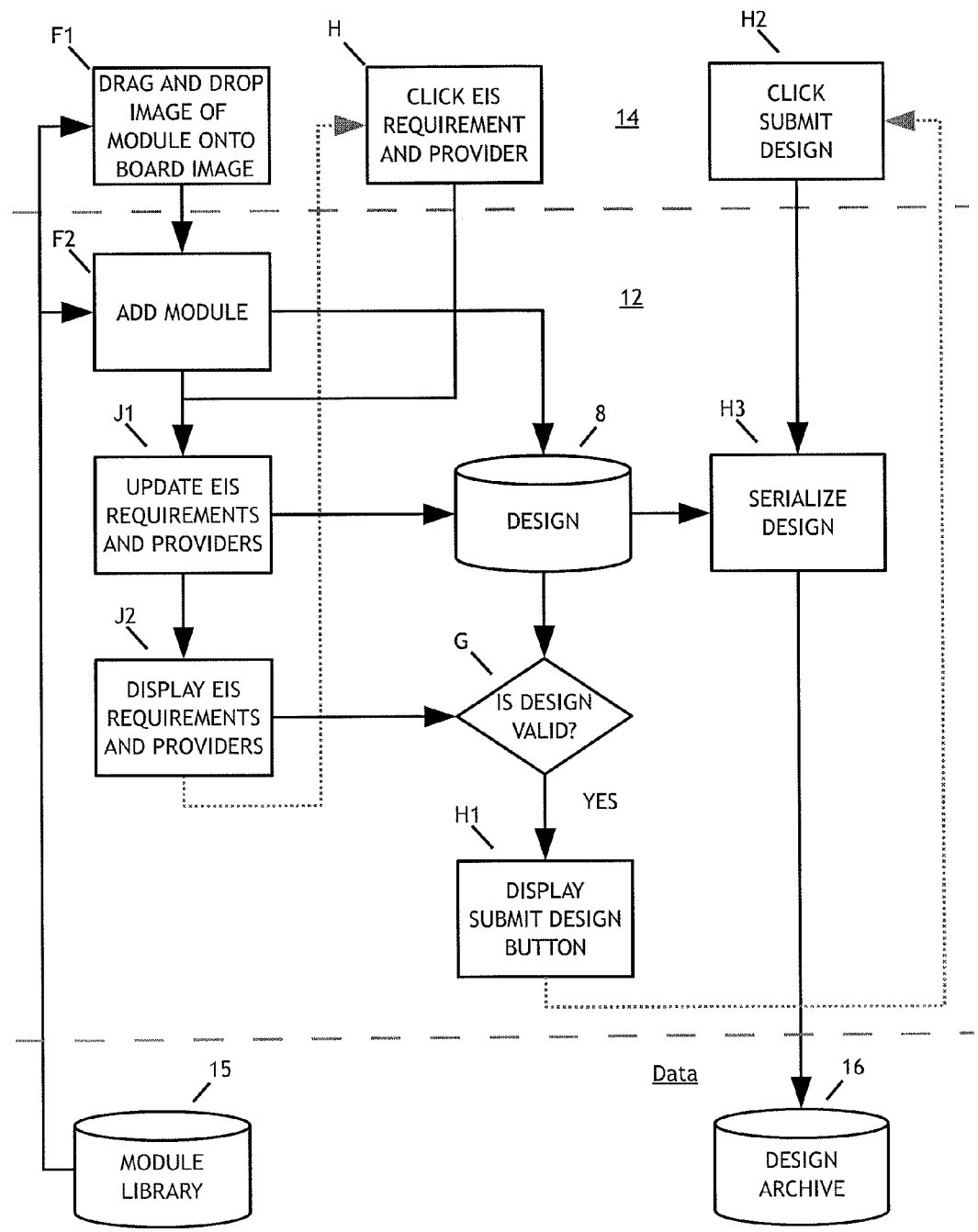
FIG. 2 is a flow chart illustrating client-side processing elements of the system according to the invention.

There are a number of novel features that make such automation possible as hereinafter explained. Referring to FIG. 2, a flow diagram shows the processes surrounding the functional layout design subsystem 12. This function may be carried out via the user's web browser, or if desired, on a separate computer set up as a server. FIGS. 5A-5I provide illustrations of the results of the following steps.

Figure 5A:
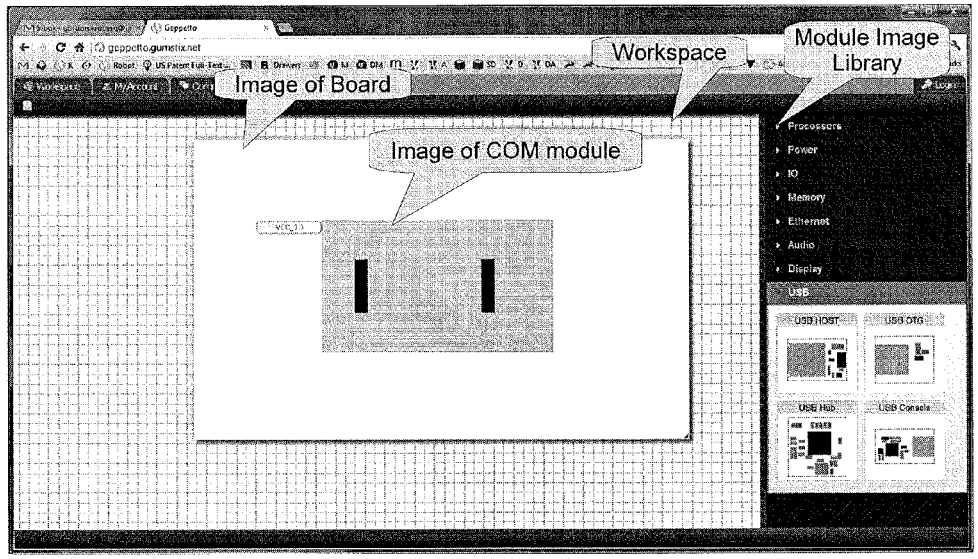
FIGS. 5A-5I are images illustrating displays for steps in the design process.
Figure 5B:
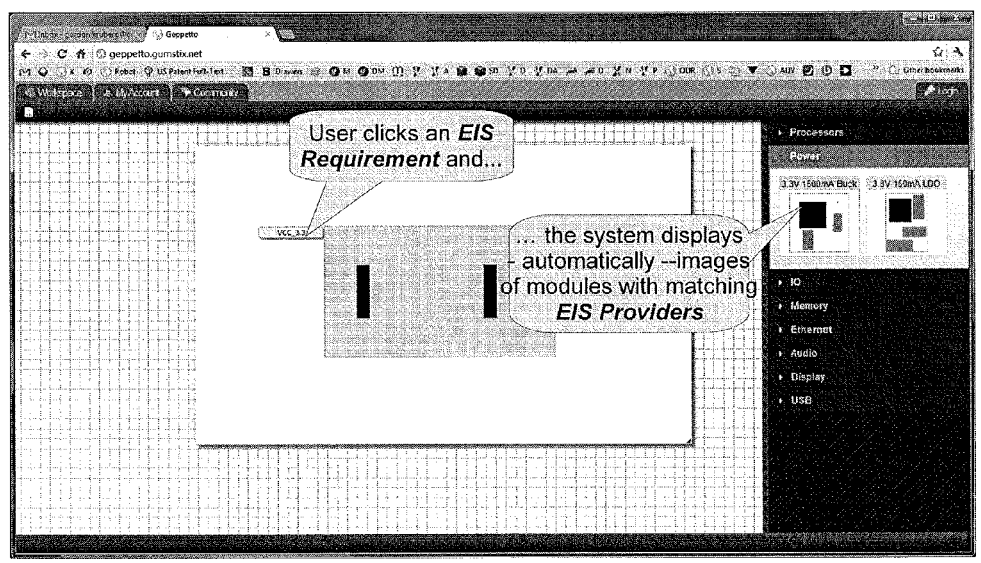
Figure 5C:
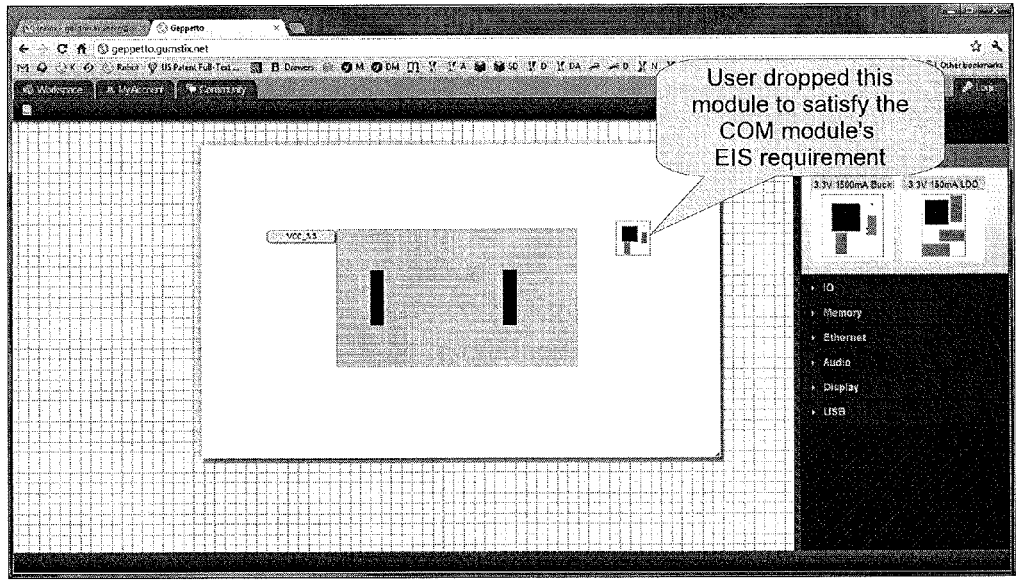
Figure 5D:
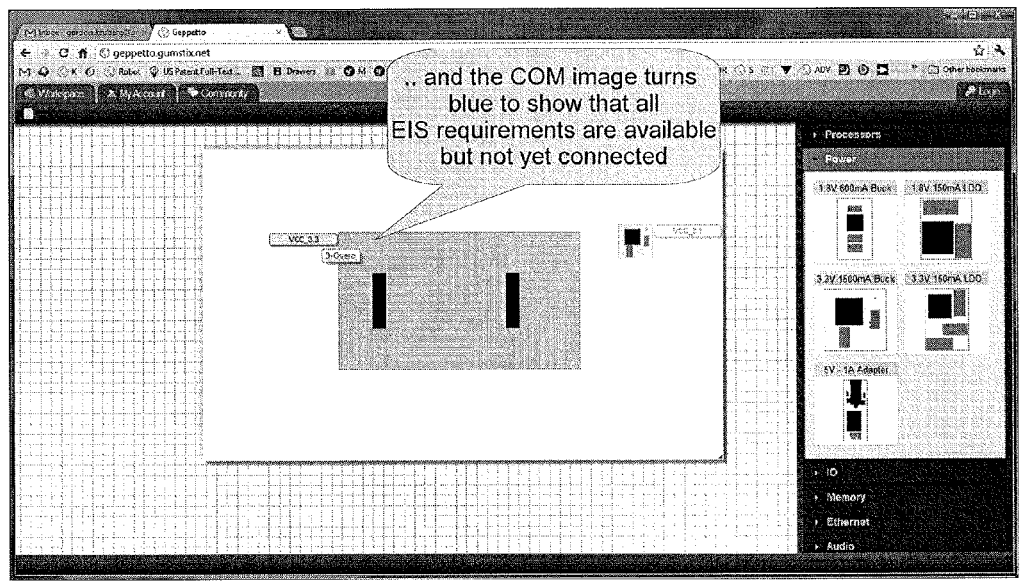
Figure 5E:
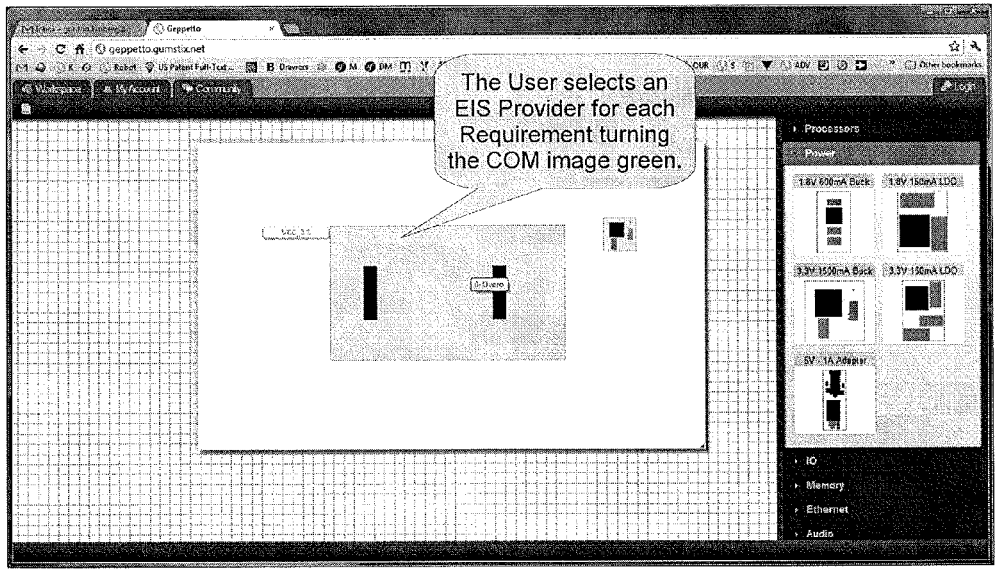
Figure 5F:
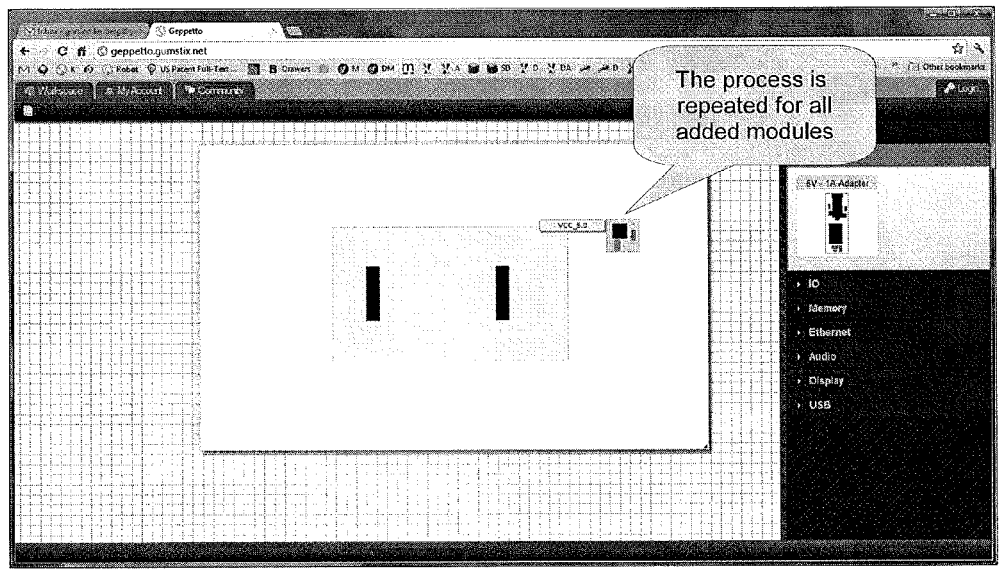
Figure 5G:
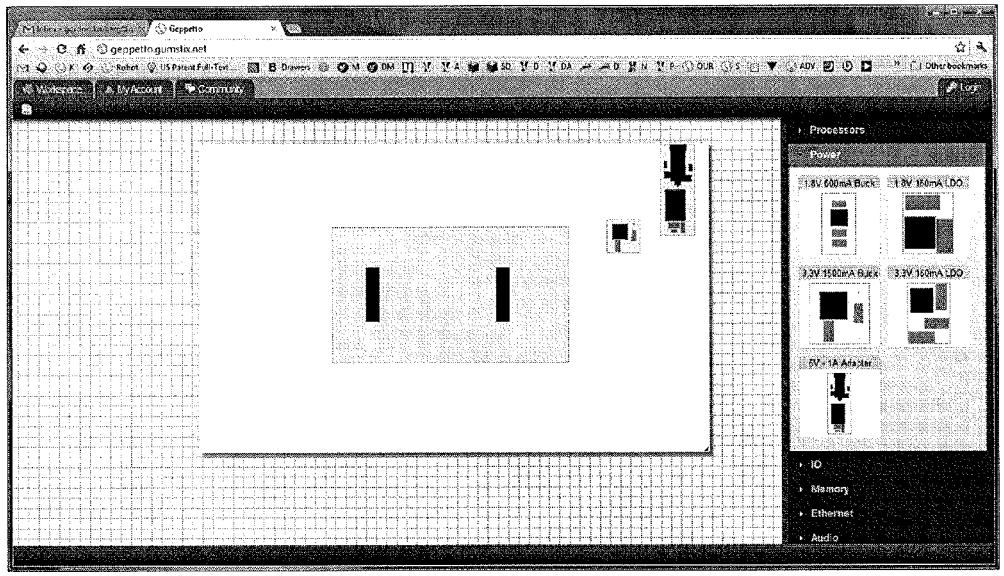
Figure 5H:
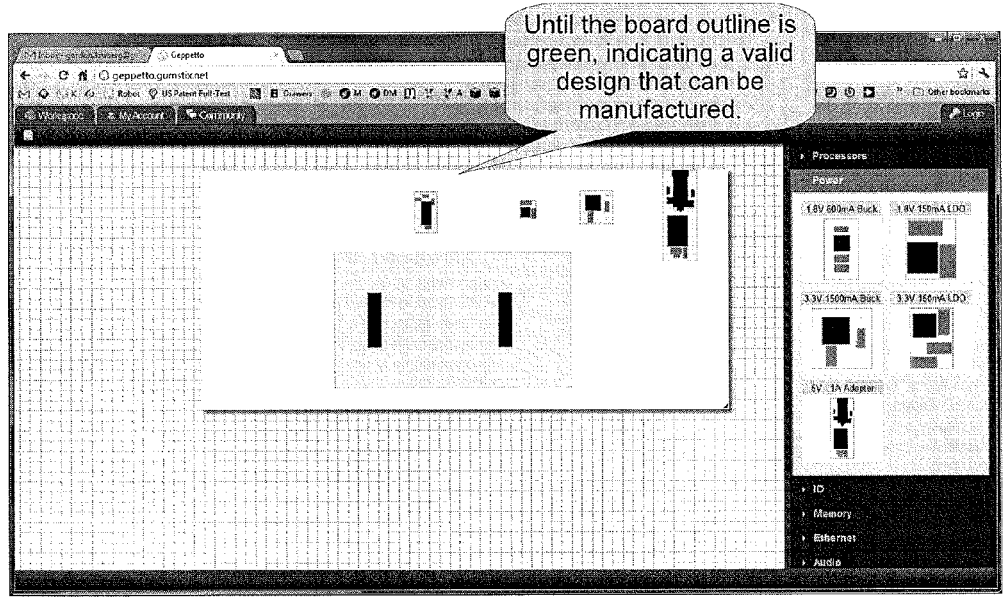
Figure 5I:
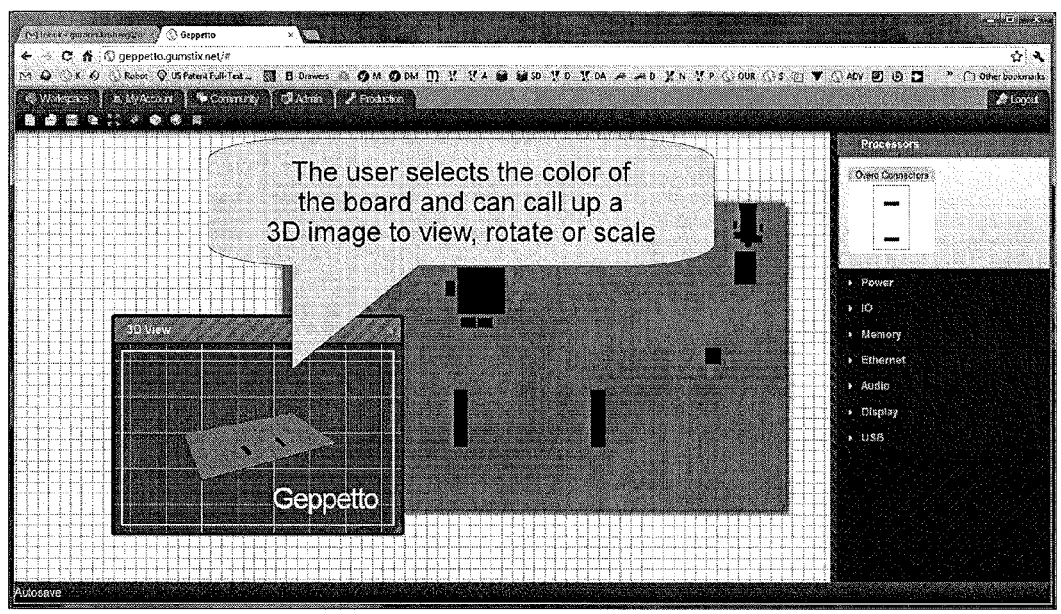

The user input interface subsystem 14 includes a graphical user interface that provides the ability to tag, drag and drop icons or images representing stored module designs on to a displayed representation of a circuit board system to schematically design a circuit board by dropping images of the modules graphically onto a circuit board. This includes images of the board and images of one or more COMs in a workspace drawn from a palette with various categories of modules (FIG. 5A). The interface provides indicators that prompt the user as to allowable and disallowable operations in an interactive process until the design is completed (FIGS. 5B-5I). Drawing from the module library 15, the user drags and drops modules onto the board image on the display 17 (Step F1), adds modules (Step F2), whereupon the EIS requirements and the providers are updated (Step J1) and displayed (Step J2) and saved to a design buffer 8 (FIG. 2). The saved design is tested for validity (Step G) and if rejected, waits for the user to add additional modules and/or connections. If all EIS requirements are satisfied (Step G), the user interface subsystem 12 invokes a display of a "submit design" button (Step H1). When the submit design button is invoked (Step H2), data is drawn from the design buffer and the final design, namely the resultant EIS connections, module data (position and orientation) and board dimensions is serialized (Step H3) and stored as user data in the design archive 16. This information is employed by the functional layout design subsystem 12 to generate scripts as hereinafter explained that are shared with the EDA tool 18. Image data stored in the module library 15 is also available to the functional layout design subsystem 12 for creating scripts that run the EDA tool 18. When user data for a design is stored, the administrative operations may begin manufacturing steps.

Figure 3:
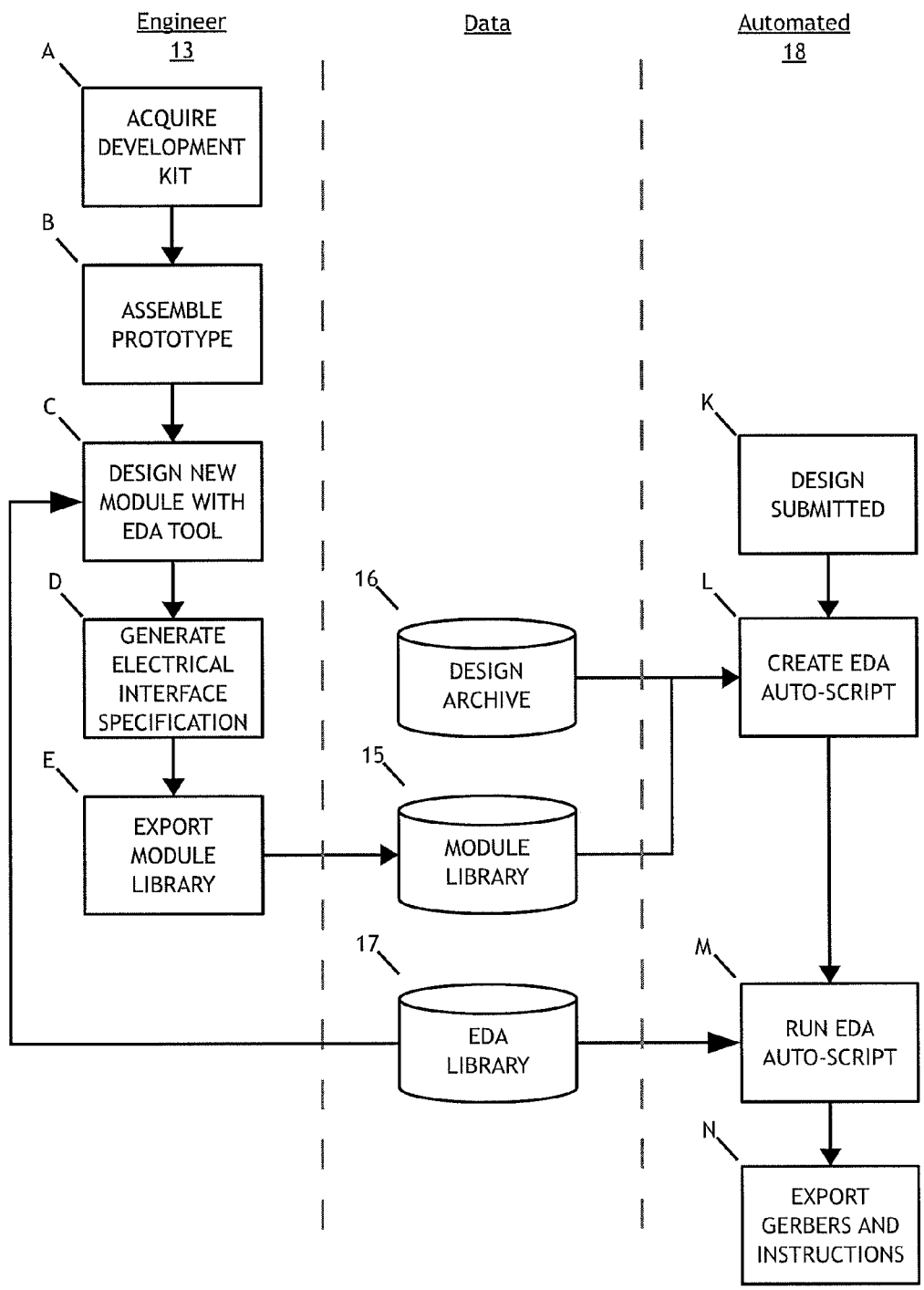
FIG. 3 is a flow chart illustrating server-side processing elements of the system according to the invention.

Referring to FIG. 3, server-side operation in illustrated. Operation comprises three elements, an engineering function 13, data storage, and an administrative program as part of the EDA tool 18. It is necessary to have access to a predefined module library 15 of predefined elements or module data. To design a module library 15 containing such module data, a suitable engineer designs discrete functional elements, including COMs (some with preloaded operating systems, and/or preloader, boot, loader, kernel, and root/file system), power sources, connectors and ports, interfaces, such as USB and Ethernet, display interfaces, memory, and external storage such as flash memory. These are presented to the user as part of the palette (FIG. 5A).

At the outset, the electrical engineer must have or acquire a development kit for each module (Step A). A prototype is typically assembled from discrete components (Step B). The engineer defines an electrical interface specification (EIS) for the module (Step D) through the EDA design tool and file system. A program then exports the module data consisting of the module data, which comprises the schematic diagram, PCB layout, EIS and an image to the module library 15 (Step E).

Once a "build board" instruction is invoked, and after the design has been submitted (Step K), administrative operations employ module data from the module library 15 and user data from the design archive 16 to create an EDA auto-script (Step L). The EDA auto-script, or more generically the design instruction set, is then used to control the EDA scripting elements or EDA tool 18. The EDA tool 18 uses information from its compatible EDA library 17 to run the EDA auto-scripts lay out the physical structure of the circuit board and to produce the instructions to the manufacturing subsystems to build the circuit boards. More specifically, the EDA tool 18 automatically lays out the physical structure of the board with all modules and interconnections in proper orientation and input/output connections, from which it creates a set of computer aided design instructions. These operations are called auto placement and auto-routing. Thereafter the CAD tool 18 dispatches the CAD instruction with the data from the module library and design archive. Gerbers and associated indicia are generated and exported to be captured and stored (Step N) for use in the next phase, namely in the ERP subsystem, as previously explained.

Figure 4:
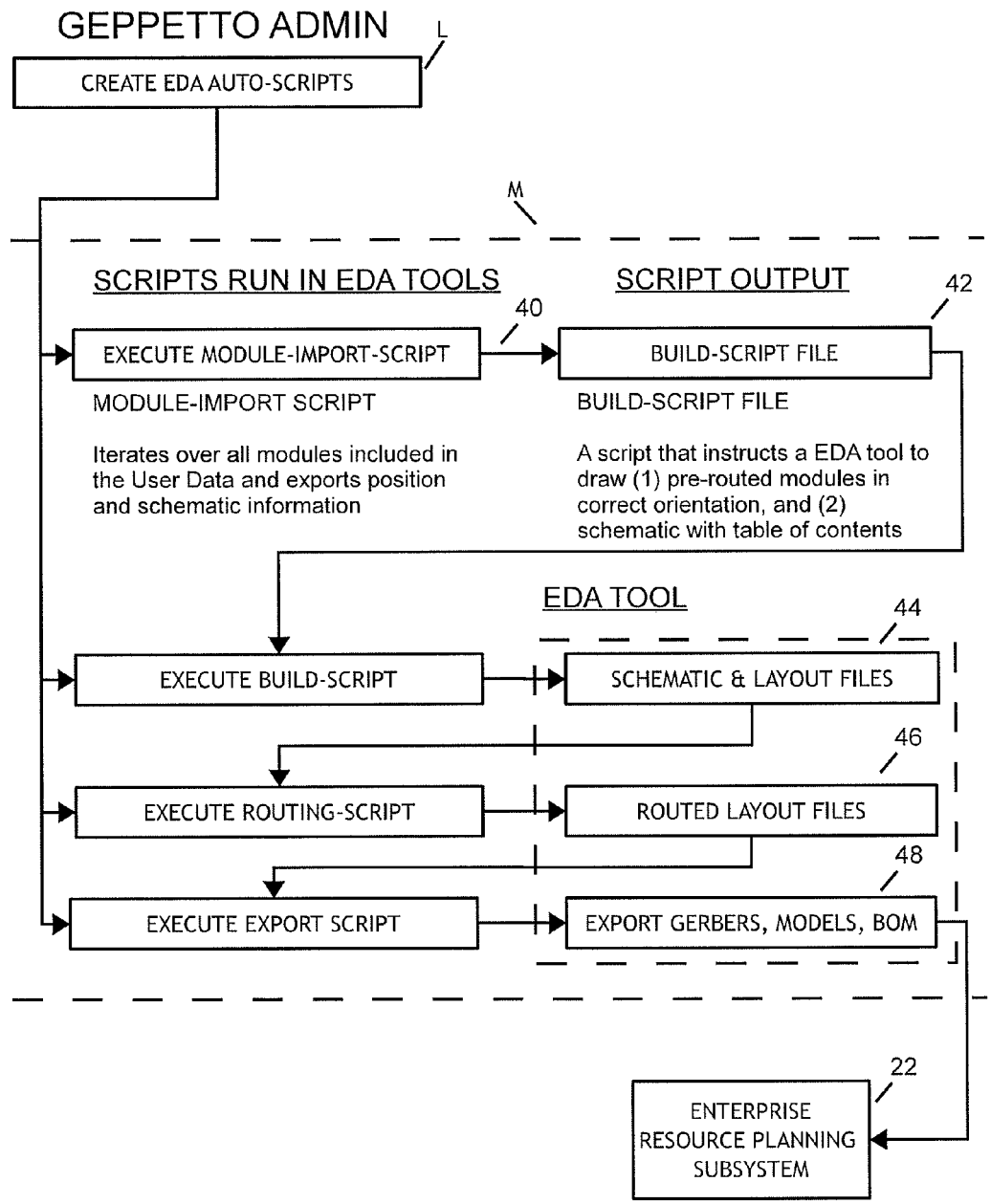
FIG. 4 is a block diagram illustrating administrative processing according to aspects of FIG. 3.

FIG. 4 is a flow chart for explaining the use of scripts in the invention. The EDA tool 18 uses auto-scripts created by the Geppetto administration tool (Step L) to perform its tasks (Step M). While the details of the scripts are unique to the particular modules and allowable designs, there are four types of scripts that run in a CAD tool, namely a module-import script 40 to receive the auto-scripts by iterating over all modules included in the user data set and exporting position and schematic information about the board design, a build script 42 to draw the pre-routed modules in correct orientation and to draw the schematic with a table of contents, a routing script or set of schematic and layout files 44, and an export script 46 to export routed layout files as gerbers models and BOM 48.

Electrical Interface Specification

A module comprises a name, category, description, EIS and MFS (mechanical feature specification). The Electrical Interface Specification (EIS) is an interface standard associated with the invention that comprises buses (defined in the schematic), and the MFS comprises the lines indicating placement restrictions and points of interest (defined in the layout). Together they enable a lay designer to design printed circuit board assemblies. It forms the basis for the functional design layout subsystem of the invention. A module as used here is a set of meta-data exportable from the schematic diagram, PCB layout and filesystem path. It is stored in the module library 15 for use by the UII subsystem 14 and the scripting subsystem 18.

EIS buses are defined as a collection of signals (nets) that are functionally related and that conform to the naming scheme provided below to allow for automated connection. Buses must be classified as a requirement or a provider. In order for a design to be built, all EIS requirements must be connected to an EIS provider (with a corresponding set of properties). See pseudocode for matching algorithm details.

Naming Conventions

Buses:
All nets to be used outside of the module must be connected to a bus.
The Electronic Interface Specification is provided as a name-value encoded string that serves as the bus name.
The following properties are encoded in the bus name:
NAME: A bus name that is unique to the module.
TYPE: Does this bus provide or require some function from an external module.
MATCH: For provide buses: the string; for require buses: the pattern.
QTY: For provide buses: the capacity; for require buses: the amount of capacity used.
IDX: If any nets on a bus are multiplexed, the index identifies the name for the net that corresponds to the bus function.
LVL: The voltage level of the bus. Must be the same for a match to be made.
WIRE: The priority for this bus when automatically connecting.
ROUTE: The priority for this bus when automatically routing.

Examples
NAME=VCC_1.8&MATCH=VCC_1.8&TYPE=R&QTY=1&IDX=1&LVL=1.8&WIRE=1&ROUTE=1
NAME=I2C&MATCH=I2C*&TYPE=R&QTY=0&IDX=1&LVL=1.8&WIRE=1&ROUTE=1
NAME=VCC_5.0&MATCH=VCC_5.0&TYPE=P&QTY=1000&IDX=1&LVL=5.0&WIRE=1&ROUTE=1

Nets:
Nets connected to an EIS type provide should be named according to the following template:
first-bus-name_first-function& . . . &last-bus-name_last-function
Example:
GPIO0GPIO0&UART1_TX
GPIO1_GPIO1&UART1_RX
The corresponding bus names would be:
NAME=GPIO0 . . . IDX=1
NAME=UART1 . . . IDX=2
NAME=GPIO1 . . . IDX=1

[0046] The following pseudo code represents a further level of detail of this invention.

[0047] Functional Layout Design Subsystem

User data is stored in this global variable which is stringified and posted to the server

global design

```
#--------------------------------------------------------------------
# When a change effecting the EIS is made, the entire design must be updated.
#--------------------------------------------------------------------
function updateDesign:

for module in design.modules:
        updateModuleOptions(module)
        updateModuleStatus(module)
```

[0048]
```
#--------------------------------------------------------------------
# Determine whether all of the requirements outlined by the modules
# electrical interface specification have been satisfied.
#--------------------------------------------------------------------
function validateDesign:

design.ready = true
    design.valid = true
    for module in design.modules:
      if (module.ready == false)
        design.ready = false if (module.connected == false)
        design.valid = false
    if (design.valid)
        displaySubmitDesign()
```

[0049]
```
#--------------------------------------------------------------------
# Whenever something on the board changes, make sure that each modules EIS
# requirements have an up-to-date list of possible EIS providers.
-------------------------------------------------------------------- function updateModuleOptions(module)
```

```
        for requirement in module.requirements:
            revalidateOptions(requirement)
            searchForOptions(requirement)
```

[0050] #--------------------------------------------------------------------------

```
# Make sure that the module an EIS provider belongs to still exists. If not,
# delete the provider from the list of options.
#--------------------------------------------------------------------------
function revalidateOptions(requirement):

for (provider in requirement.options):
            if moduleNotExists(provider.module_id):
                delete provider
```

[0051] #--------------------------------------------------------------------------

```
# Given an EIS requirement, search for EIS providers in all modules except the
# one with the requirement.
#--------------------------------------------------------------------------
        function searchForOptions(requirement)
        for module in design.modules:
        if module = requirement.module:
        continue
        searchProviders(requirement, module.providers)
```

[0052] #--------------------------------------------------------------------------

```
# Given one modules requirement and another's list of providers, check whether
# any provider satisfies the requirement. The conditions for qualifying as a
# possible provider are:
# - The match parameters must constitute a regular expression match
# e.g. I2C* matches I2C0, I2C1, I2C3
# - The bus must not have been excluded. When one signal that belongs to
# multiple buses has been assigned to a particular bus, the second bus is said
# to have been excluded.
# - The bus must have enough capacity to support the required usage
# - The bus voltage levels must match
#--------------------------------------------------------------------------
function searchProviders(requirement, providers)
for provider in providers:
if not regularExpressionMatch(requirement.match, provider.match):
continue if busIsExcluded(provider):
continue
```

```
if not busHasCapacity(requirement.usage, provider.capacity):
continue if requirement.level != provider.level:
continue if provider in requirement.options:

continue option = {
'selected' : false,
'module_id' : provider.module_id,
'name' : provider.name
}
appendOption(requirement, option)
```

[0053]
```
#------------------------------------------------------------
# Update a module's ready and valid flags
#------------------------------------------------------------
function updateModuleStatus(module)
module.ready = true
module.connected = true
if module.number_of_requirements = 0:
return
for requirement in module.requires:
updateRequireStatus(requirement)
if (requirement.ready == false)
module.ready = false
if (requirement.valid == false)
module.valid = false
```

[0054]
```
#------------------------------------------------------------
# Store the design data as a JSON file and submit it to the Geppetto server
# using a POST request.
#------------------------------------------------------------
function postDesign:
stringified = stringifyDesign()
POST(url='geppetto.gumstix.net', data='stringified')
#------------------------------------------------------------
# Collect all of the design information that was provided by the user via the
# web interface and start it in a JSON file. This includes:
# - PCB dimensions
# - A list of modules in use, their position and rotation
# - A list of connections made between EIS requirements and providers
#------------------------------------------------------------
function stringifyDesign:
stringified = {
```

```
"board" : {
"width" : getBoardWidthFromDOM(),
"height" : getBoardHeightFromDOM()
},
"modules" : {},
"connections": []
}
for module in design.modules:
module_data = {
"id" : module.id,
"name" : module.name,
"x" : getModuleXFromDOM(module),
"y" : getModuleYFromDOM(module),
"angle" : getModuleAngleFromDOM(module)
}
stringified.modules.append(module_data)
stringified.connections = getConnections()
return JSON(stringified)
```

[0055] #------------------------------------------------------------

```
# Generate a list of connections between EIS requirements and providers.
#------------------------------------------------------------
function getConnections:
connections = []
for module in design.modules:
for requirement in module.requirement:
for provider in requirement.options:
if provider.selected = true:
connections.append([requirement, provider])
return connections
```

Module Design Subsystem

[0056] ##

A filesystem path to where modules are stored as a schematic diagram and PCB
layout.
global hardware_directory =
path/to/modules

[0057] #------------------------------------------------------------

```
# Generate images and data for all modules.
# Each module consists of a PCB and a schematic stored in a module directory
#------------------------------------------------------------
function exportModules():
for module_directory in hardware_directory:
exportModule(module_directory)
```

[0058] #------------------------------------------------------------------------

Given a module path containing EDA files, generate the data required by
Geppetto. This includes an image for use by the web page and a data file
containing the Electrical Interface Specification (EIS) and mechanical
dimensions.
------------------------------------------------------------------------
function exportModule(directory):
exportModuleImage()
var module = {
name: getDirectoryName(),
description: getModuleDescription(),
outline: getModuleOutline(),
buses: getEIS()
}
writeData(module)

[0059] #------------------------------------------------------------------------

Create a script that exports a PNG image from the EDA suite PCB editor
------------------------------------------------------------------------
function generateModuleImage:
openPCB(pcb_path)
exportPNG()

[0060] #------------------------------------------------------------------------

The design engineer writes a short description of the module in the title
block. Open the schematic file and return that description.
------------------------------------------------------------------------
function getModuleDescription:
openSchematic(schematic_path)
description = readTitleBlock()
return description

[0061] #------------------------------------------------------------------------

The design engineer draws a module outline on a particular layer to indicate
the outer dimensions. Open the module pcb file and find those dimensions.
------------------------------------------------------------------------
function getModuleOutline:
openPCB(pcb_path)
dimensions = getOutlineLayer()
return dimensions

[0062] #------------------------------------------------------------------------

The Electrical Interface Specification is an extension of a bus.
Multiple nets on a schematic can be combined into one bus to improve the
designs readability. The design engineer provides the bus with a descriptive
name that encodes an additional set of properties that are used by the

```
# Geppetto user interface and the build server.
#-----------------------------------------------------------------------
function getEIS:
pcb = openPCB(pcb_path)
eis = {}
for bus_name in pcb:
bus_properties = parseBusName(bus_name)
eis[bus_name] = bus_properties
return eis
```

[0063] #-----------------------------------------------------------------------

```
# Given the bus name from the schematic, return the EIS properties.
#-----------------------------------------------------------------------
function parseBusName(bus_name):
properties = {}

# split the bus name at the ampersand into a list of key/value pairs

key_value_pairs = bus_name.split('&')

# Split each key/value pair into a property name and value.
# Property definitions can be found in the Electrical Interface
# Specification.

for pair in key_value_pairs:
key, value = pair.split('=')
properties[key] = value
return properties
```

[0064] #-----------------------------------------------------------------------

```
# Store the module data in a database for use by the Geppetto web server and
# backend
#-----------------------------------------------------------------------
function writeData(module):
openModuleDatabase()
databaseAppend(module)
```

User Interface Subsystem global selected_requirement

[0065] #-----------------------------------------------------------------------

```
# When a module image is dropped on the board image, the module name, which is
# stored with the image HTML, is used to find the module prototype in the
# library. The prototype is used to add a unique module instance to the design.
#-----------------------------------------------------------------------
function moduleAdded(name):
```

```
var module = {
'id' : id_counter,
'name' : name,
'angle' : 0,
'ready' : false,
'connected' : false,
'provide' : {},
'require' : {}
}
var prototype = library[name]
```

[0066] #

```
# create a list of buses this module requires

for bus in prototype.buses:
if bus.type = 'R':
module.require[bus.name] = bus
elis bus.type = 'P':
module.provide[bus.name] = bus
```

[0067] #

```
# add the new module to the design, use the unique id as the key

design.modules[module.id] = module
updateDesign()
validateDesign()
```

[0068] #------------------------------------------------------------------

```
# When the user clicks on a require bus, store it in a special global variable
# so that the EIS requirement can be modified when a suitable provider is
# selected.
#------------------------------------------------------------------
function requireClicked(bus):
selected_requirement = bus
```

[0069] #------------------------------------------------------------------

```
# When an EIS provider is selected for a requirement, modify the connected
# status and selected option for that bus.
#------------------------------------------------------------------
function provideClicked(bus):
selected_requirement.connected = true
deselectAll(selected_requirement.options)
selected_requirement.options[bus].selected = true
updateDesign()
validateDesign()
```

[0070] #----------------------------------------------------------------------

When the user submits their design for assembly.
----------------------------------------------------------------------
function submitDesignClicked():
postDesign()

EDA Scripting Subsystem

[0071] ##

An object that contains the EIS data for all modules. Can be stored in a flat
filesystem or a database.
global library
----------------------------------------------------------------------
When data is posted to the server, a handler deserializes (converts the string
to an object) and then initiates the build process.
----------------------------------------------------------------------
function handlePOST(web_data):
design_data = loadJSON(web_data)
buildDesign(design_data)

[0072] #----------------------------------------------------------------------

With the posted user data and the module library containing schematic diagram,
PCB layout, and Electrical Interface Specification, create an application-
specific circuit board design.
----------------------------------------------------------------------
function buildDesign(data):
createTableOfContents(data.modules)
for module in data.modules:
exportModule(module, connections)
importModule(module)
drawOutline(data.board)
autoRoute()

[0073] #----------------------------------------------------------------------

Add a frame to the first page of the schematic identifying the design name
and contents of each schematic page.
----------------------------------------------------------------------
function createTableOfContents(modules):
header_position = [header_x, header_y] # some coordinates
schematic.addFrame()
schematic.addText("Table of Contents", header_position)
number_of_modules = length(modules)
for i in range(0, number_of_modules):
item = i + ". " + modules[i].name
schematic.addText(item, [item_x, item_y])

```
item_y += row_height
schematic.addSheet()
```

[0074] #--------------------------------------------------------------------------------

```
# Make a copy of a module template (the schematic and layout) and create an
# instance for this specific design.
#--------------------------------------------------------------------------------
function exportModule(module, connections):
```

[0075] #

```
# Make a unique copy of the module for this project

copyModuleSchematic()
copyModulePCB()
```

[0076] #

```
# Look for connections that involve this module and give nets unique names
# to connect them according to the user's specification.

for connection in connections:
if module.id == connection.provider.module_id:
for net_name in connection.provider.nets:
new_name = getUniqueNetName(net_name, connection)
schematic.renameNet(net_name, new_name)
else if module.id == connection.requirement.module_id:
for net_name in connection.requirement.nets:
new_name = getUniqueNetName(net_name, connection)
schematic.renameNet(net_name, new_name)
```

[0077] #

```
# Rotate the module layout according to the user's specification. This
# involves grouping all elements of the layout including components and traces
# and rotating the entire group.
pcb.rotate(module.angle)
```

[0078] #

```
# Strip EIS data and unused nets from the module.

deleteBuses()
clearUnusedNets()
```

[0079] #

```
# Create a script that can be used to import this module into a new project.

``` exportToScript()

[0080] #------------------------------------------------------------------------

```
# Nets are connected across schematic pages symbolically. By giving two nets the
# same name, the EDA tool knows that they should be connected. Geppetto
# connects nets according to the scheme:
# [Provide Module ID].[Provide Bus Name]_[Function Name]
# Example:
# 0.SPI1_MOSI
#------------------------------------------------------------------------
function getUniqueNetName(net_name, connection):
provider_id = connection.provider.module_id
provider_bus = connection.provider.name
function_index = connection.requirement.idx
function_name = getFunctionName(net_name, function_index)
name = provider_id + '.' + provider_bus + '_' + function_name
```

[0081] #------------------------------------------------------------------------

```
# Take a net name representing a list of possible functions and return the
# function corresponding to the selected bus index.
# Example:
# GPIO32&MOSI&CS function one is MOSI
#------------------------------------------------------------------------
function getFunctionName(string, index):
function_list = string.split('&')
return function_list[index]
```

[0082] #------------------------------------------------------------------------

```
# Delete all nets that have not been given a unique name to ensure that they are
# not unintentionally connected.
#------------------------------------------------------------------------
function clearUnusedNets(module):
for bus in library[module.name].buses:
schematic.deleteNets(bus)
```

[0083] #------------------------------------------------------------------------

```
# Create a new schematic sheet for each module and run the script that was
# exported from the schematic and layout. Position the modules according to
# the user specification.
#------------------------------------------------------------------------
function importModule(module):
schematic.addSheet()
importFromScript(module, module.x, module.y)
```

The invention is expected to find a number of applications.
+++

1) The Small Business Customer

COM customers typically fall into two categories, the first being a hobbyist or researcher building a prototype. The researcher may purchase a small number of COMs and expansion boards from Gumstix and modify them to meet specific needs. In many cases, the researcher, receiving outside funding for the product may become the second category, the volume customer. Volume customers may be expected to continue to buy COMs but design and manufacture a custom expansion board that meets their exact mechanical and electrical requirements. This represents a major challenge for businesses without PCB design expertise, and a lost opportunity for the COM manufacturer. Geppetto allows COM manufacturers to leverage the existing supply chain and infrastructure to provide custom PCB design and manufacturing services. The effect is two-fold for customers. They get the flexibility of a custom design with the reliability of an off-the-shelf design. It also reduces the OEM's list of suppliers.

2) The Artist

Electronic circuit board design is an expensive and challenging multi-faceted discipline. The Geppetto tool is an alternative to conventional Electronic Design Automation (EDA) tools that are focused on wire-level design. Using such packages, an engineer creates a symbolic representation of circuit elements and their interconnections. Once the schematic is finished, components and wires are mapped to footprints and traces on the printed circuit board drawing. Geppetto adds another layer of abstraction to the circuit design phase allowing users to simply drag and drop functional modules such as memory, USB I/O, networking, etc.

The symbolic representation of the modules provides the physical information (i.e. size, connector positions) a designer needs to integrate the layout phase. Buses, functional collections of wires, form the basis of an interconnection system that requires a minimal amount of user input. An automated system for connecting busses combined with functional modules completely eliminates the circuit layout phase from this tool. The net result is that an artist with a knowledge of consumer electronics can create a designer computer.

Process Example

1) Scenario

A user wants to build a computer for automobiles that can track position, monitor the vehicle health, and serve as a media center.

Requirements:
Overo COM
12V Power Input
CAN bus for monitoring and controlling automotive subsystems
GPS for trip tracking and navigation
HDMI output for a monitor
Design
Create a user account at a website
Select File -> New from the menu bar—A design area and module library will appear
In the module library, click on the Processors category
Drag an Overo COM onto the blank PCB in the design area
Click on the Power category and drag 12V power onto the board
Add remaining modules
Modules highlighted in red have unsatisfied bus requirements, click on each for a list of modules that can fill the requirement. The designer may have to add additional modules from the library.
Position the modules and resize the board to meet mechanical requirements. One can drag them into place or, for greater precision, use the dimensioning tool.
Select File -> Save
Preview The preview menu will provide users with preliminary design data such as 3D renderings, software, and quotations.

5) Build

Place an order for the design created.
Accept delivery.

These last subsystem functions depend upon subsystems not directly under control of the Geppetto tool of the inventive system but which are intended to be modified to accept input and to be locally automated in accordance with the invention.

The invention has been explained with reference to specific embodiments. Other embodiments will be evident to those of ordinary skill in the art. It is therefore not intended that this invention be limited, except as indicated by the appended claims.

What is claimed is:

1. A functional layout design subsystem for use with a computer aided design subsystem and an administrative subsystem, the functional layout design subsystem comprising:

a module library of pre-verified module data representing board-mountable electronic components or subsystems, the board mountable components or subsystems each having associated therewith a unique identifier for use by the computer aided design subsystem and the administrative subsystem, said board mountable components or subsystems each further corresponding to a displayable schematic representation described as a set of rules defining allowable inter-relationships between discrete functional electronic modules, said modules being defined by a combination of both (a) electrical connectivity rules linked to a schematic, and (b) mechanical placement rules linked to a layout, in order to form library elements of said module library, the electrical connectivity rules comprising buses that are a collection of signals, and a label characterizing information carried on said signals, said information specifying the functional definition of the modules, thereby allowing for automated connection among the modules, for use by a user having minimal knowledge of circuit design and function in the functional layout design subsystem, and wherein the layout design interface includes a drag and drop functionality for said board-mountable electronic components.

2. The system according to claim 1, wherein said design instructions for said circuit board include scripts for invoking operations in said computer aided design subsystem.

3. The system according to claim 2, wherein said scripts comprise instructions for interconnection among modules and subsystems, and for placement and orientation of modules and subsystems.

4. A method comprising:

retrieving a graphical representation of a plurality of functional electronic modules through a layout design interface subsystem having a display, wherein a user having minimal knowledge of electronic circuit design can define a circuit board function;

interactively designating physical placement of functional electronic modules on a representation of a circuit board, wherein the user is constrained by interaction with the layout design subsystem;

representing permissible interconnections among electronic modules and to power connections, input connections and output connections defined by (a) electrical connectivity rules, the electrical connectivity rules comprising buses that are a collection of signals, and a label characterizing information carried on said signals, said information specifying the functional definition of the modules, thereby allowing for automated connection among the modules, and (b) mechanical placement rules linked to a layout, in order to form library elements, wherein the library elements are stored in an electronic archive in a form retrievable by the user;

to define design instructions of a functional electronic system formed upon at least one circuit board;

in response to the design instructions, causing a computer aided design subsystem to generate a manufacturing instruction set; and in response to said manufacturing instruction set, causing an administrative subsystem to generate gerbers and manufacturing instructions for directing component vendors, board assemblers and shippers to manufacture and deliver according to specifications provided by an intended user as a functional circuit board in accordance with said manufacturing instructions and without further intervention from the intended user.

5. A method comprising:

retrieving a graphical representation of a plurality of functional electronic modules through a layout design interface subsystem having a display, wherein a user having minimal knowledge of electronic circuit design can define a circuit board function;

interactively designating physical placement of functional electronic modules on a representation of a circuit board, wherein the user is constrained by interaction with the layout design subsystem;

representing permissible interconnections among electronic modules and to power connections, input connections and output connections defined by (a) electrical connectivity rules, the electrical connectivity rules comprising buses that are a collection of signals, and a label characterizing information carried on said signals, said information specifying the functional definition of the modules, thereby allowing for automated connection among the modules, and (b) mechanical placement rules linked to a layout, in order to form library elements, wherein the library elements are stored in an electronic archive in a form retrievable by the user;

to define design instructions of a functional electronic system formed upon at least one circuit board;

in response to the design instructions, causing a computer aided design subsystem to generate a manufacturing instruction set;

in response to said manufacturing instruction set, causing an administrative subsystem to generate gerbers and manufacturing instructions; and employing the gerbers and manufacturing instructions to direct component vendors, board assemblers and shippers to manufacture and deliver according to specifications provided by an intended user as a functional circuit board in accordance with said manufacturing instructions and without further intervention from the intended user.

* * * * *